No. 780,531.  
Patented January 24, 1905.

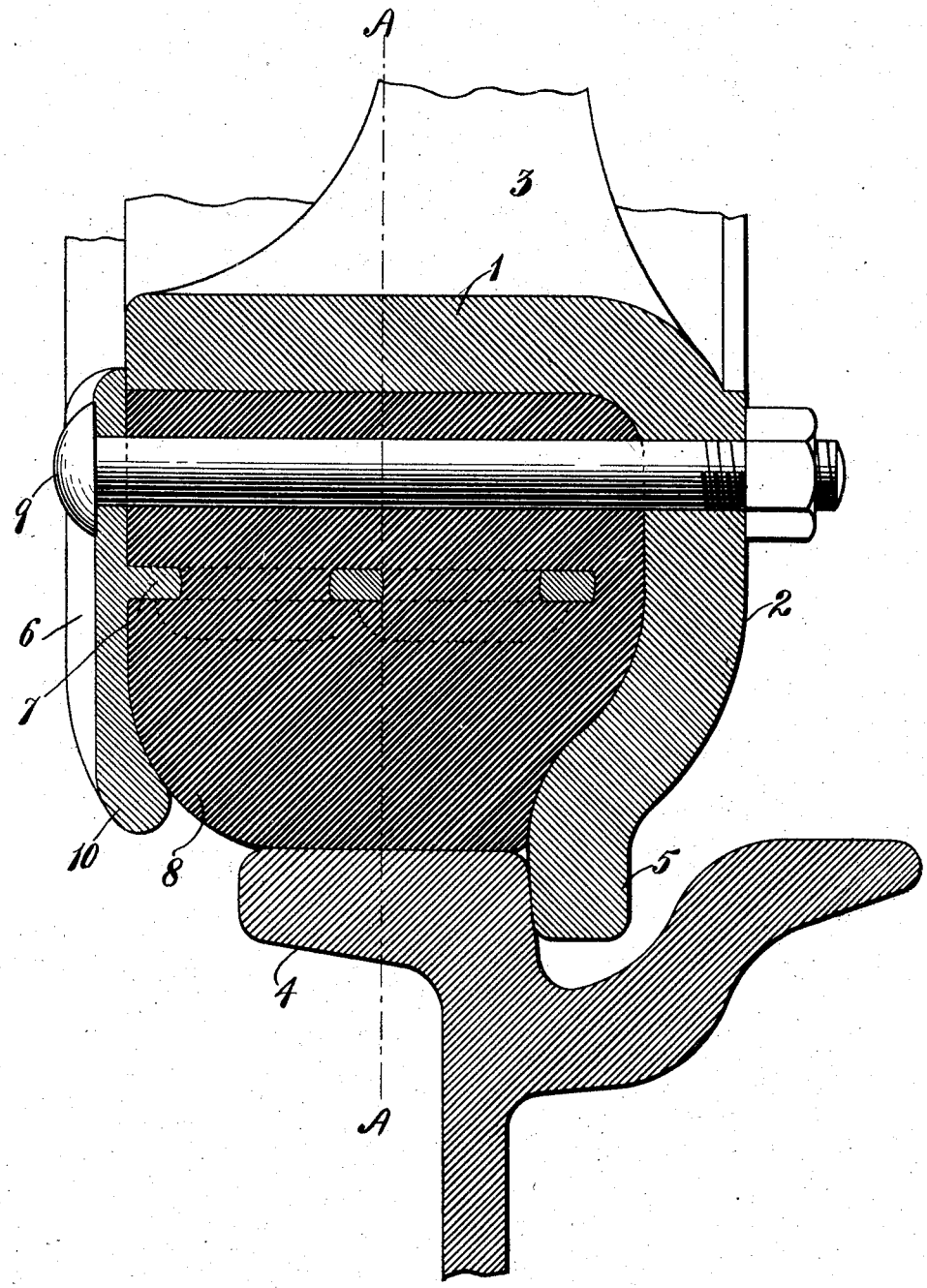

UNITED STATES PATENT OFFICE.

ISIDORE H. SAMPERS, OF NEW YORK, N. Y., ASSIGNOR TO THE NOISELESS CAR AND CAR WHEEL COMPANY, OF NEW YORK, N. Y., A CORPORATION OF NEW YORK.

CAR-WHEEL.

SPECIFICATION forming part of Letters Patent No. 780,531, dated January 24, 1905.

Application filed September 26, 1903. Serial No. 174,711.

*To all whom it may concern:*

Be it known that I, ISIDORE H. SAMPERS, a citizen of the United States, and a resident of the borough of Manhattan, in the city and State of New York, have invented a new and useful Improvement in Car-Wheels, of which the following is a specification.

My invention relates to an improvement in car-wheels, and more particularly to the construction of the rim and tire, with the object in view of preventing the tire from creeping or bulging and becoming set out of its normal shape.

A practical embodiment of my invention is represented in the accompanying drawing, which represents a transverse section through the rim and tire and through a portion of the rail on which the tire is intended to bear.

The wheel-rim consists of a base 1 and a flange 2, the base being that portion to which the spokes 3 are attached and the flange 2 being that portion which is extended down past the bearing-face of the rail to hold the wheel on the track.

The base 1 preferably presents a cylindrical surface to the bearing-face of the rail 4, while the flange 2 leaves the base at a point inward from the inner edge of the bearing-face of the rail and gradually curves outward toward that edge as the retaining portion 5 of the flange approaches the bearing-face of the rail.

A keeper 6 of annular form, with a portion 7 embedded in the elastic tire 8 after the manner shown, described, and claimed in Patent No. 729,450, granted to Romeo P. Tomassek May 26, 1903, is bolted to the rim by means of screw-bolts 9 and differs from that shown in the patent above referred to in that it not only extends along down the outer face of the tire, but also curves over the outer corner of the tire, as shown at 10, to prevent the creeping of the tire outwardly and downwardly between it and the bearing-face of the rail on which the tire rests. In this respect it coacts with the outwardly - curved portion of the flange 2 to prevent the elastic tire from flowing out of shape under great pressure.

The gist of my present invention lies in the structure of the rim, keeper, and tire in such manner that the tire 8, which because of the outward curve of the flange 2 and inward curve of the keeper 6, as set forth, has a width materially greater than the width of the bearing-face of the rail, will have its center of mass or central line of pressure about midway of the bearing-face of the rail. It is found that this will prevent the elastic tire 8 from gradually becoming upset under continuous pressure, keeping it at all times in its normal shape, and so will not only increase the life of the tire, but will cause the wheel to run smoothly.

The dotted line A A is placed upon the present drawing to indicate the central line of bearing-pressure, and it will be observed that the rim is so constructed and the tire so fitted to the rim that the mass of the tire is about equally divided, one half upon one side of the line A A and the other half upon the opposite side.

As the mass of the tire under great pressure has a tendency to recede from the bearing-face of the rail, it is held both upon its inner and outer faces against escape, and becomes so poised under this pressure that neither side will be allowed to creep farther away from the normal than the adjacent side, and the tire will thus be maintained in its normal position.

What I claim is—

1. In a car-wheel, the combination with a rim, of an elastic tire of greater width than the bearing-face of the rail and secured to the rim with the central line of pressure on the bearing-face of the rail substantially coincident with the central line of mass of the tire.

2. In a car-wheel, the combination with a rim and an elastic tire of greater width than the bearing-face of the rail, of a keeper for the elastic tire fastened to the rim, the said keeper being extended down the outer side of the tire and curved inwardly over the outer edge of the tire.

In testimony that I claim the foregoing as my invention I have signed my name, in presence of two witnesses, this 24th day of September, 1903.

ISIDORE H. SAMPERS.

Witnesses:
   FREDK. HAYNES,
   HENRY THIEME.